(12) United States Patent  
Heusmann et al.

(10) Patent No.: US 7,190,571 B2  
(45) Date of Patent: Mar. 13, 2007

(54) CHIP CAPACITOR AND METHOD FOR THE PRODUCTION THEREOF

(75) Inventors: Hans Heusmann, Rottenfuss (DE); Rui Nunes, Evora (PT)

(73) Assignee: Kemet Electronics Corporation, Greenville, SC (US)

( * ) Notice: Subject to any disclaimer, the term of this patent is extended or adjusted under 35 U.S.C. 154(b) by 0 days.

(21) Appl. No.: 10/514,788

(22) PCT Filed: May 21, 2003

(86) PCT No.: PCT/DE03/01646

§ 371 (c)(1),  
(2), (4) Date: Nov. 17, 2004

(87) PCT Pub. No.: WO03/098647

PCT Pub. Date: Nov. 27, 2003

(65) Prior Publication Data

US 2005/0174719 A1    Aug. 11, 2005

(30) Foreign Application Priority Data

May 21, 2002 (DE) .............................. 102 22 405

(51) Int. Cl.  
*H01G 9/00* (2006.01)

(52) U.S. Cl. .................... 361/523; 361/508; 361/509; 361/516; 361/525; 361/528; 29/25.03

(58) Field of Classification Search ........ 361/508–512, 361/502–504, 523–528, 529–534; 29/25.03, 29/25.01  
See application file for complete search history.

(56) References Cited

U.S. PATENT DOCUMENTS

| | | | |
|---|---|---|---|
| 3,686,535 A | 8/1972 | Piper | |
| 3,781,976 A | 1/1974 | Tomiwa | |
| 4,097,916 A | 6/1978 | Piper | |
| 4,282,645 A | 8/1981 | Thompson et al. | |
| 4,539,623 A * | 9/1985 | Irikura et al. | 361/540 |
| 4,581,479 A * | 4/1986 | Moore et al. | 174/535 |
| 6,236,561 B1 * | 5/2001 | Ogino et al. | 361/523 |
| 6,343,004 B1 * | 1/2002 | Kuranuki et al. | 361/523 |
| 6,392,869 B2 * | 5/2002 | Shiraishi et al. | 361/523 |
| 6,751,086 B2 * | 6/2004 | Matsumoto | 361/523 |
| 6,816,358 B2 | 11/2004 | Kida et al. | |
| 6,903,922 B2 * | 6/2005 | Sano et al. | 361/533 |

FOREIGN PATENT DOCUMENTS

| | | |
|---|---|---|
| DE | 39 31 244 | 3/1991 |
| DE | 39 31 249 | 3/1991 |
| DE | 101 31 236 | 1/2003 |

(Continued)

*Primary Examiner*—Nguyen T. Ha  
(74) *Attorney, Agent, or Firm*—J H O'Toole; Nexsen Pruet LLC

(57) ABSTRACT

A capacitor includes a first capacitor element, a first anode contact for the first capacitor element, the first anode contact protruding from the first capacitor element, a second capacitor element, and a second anode contact for the second capacitor element, the second anode contact protruding from the second capacitor element. The capacitor also includes a cathode contact. The first and second capacitor elements are stacked, and a side of at least one capacitor element is attached to the cathode contact.

11 Claims, 4 Drawing Sheets

FOREIGN PATENT DOCUMENTS

| | | |
|---|---|---|
| DE | 102 44 713 | 2/2004 |
| EP | 0 823 719 | 2/1998 |
| EP | 0 966 007 | 12/1999 |
| EP | 1 143 465 | 10/2001 |
| JP | 01091411 | 4/1989 |
| JP | 07-240351 | 12/1995 |
| JP | 11274003 | 10/1999 |
| WO | WO03/003394 | 1/2003 |
| WO | WO04/010756 | 1/2004 |

\* cited by examiner

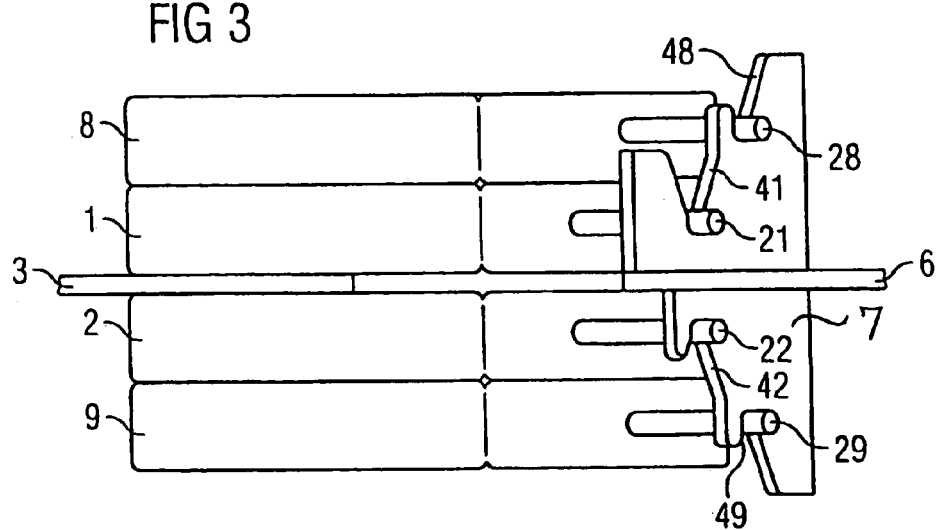
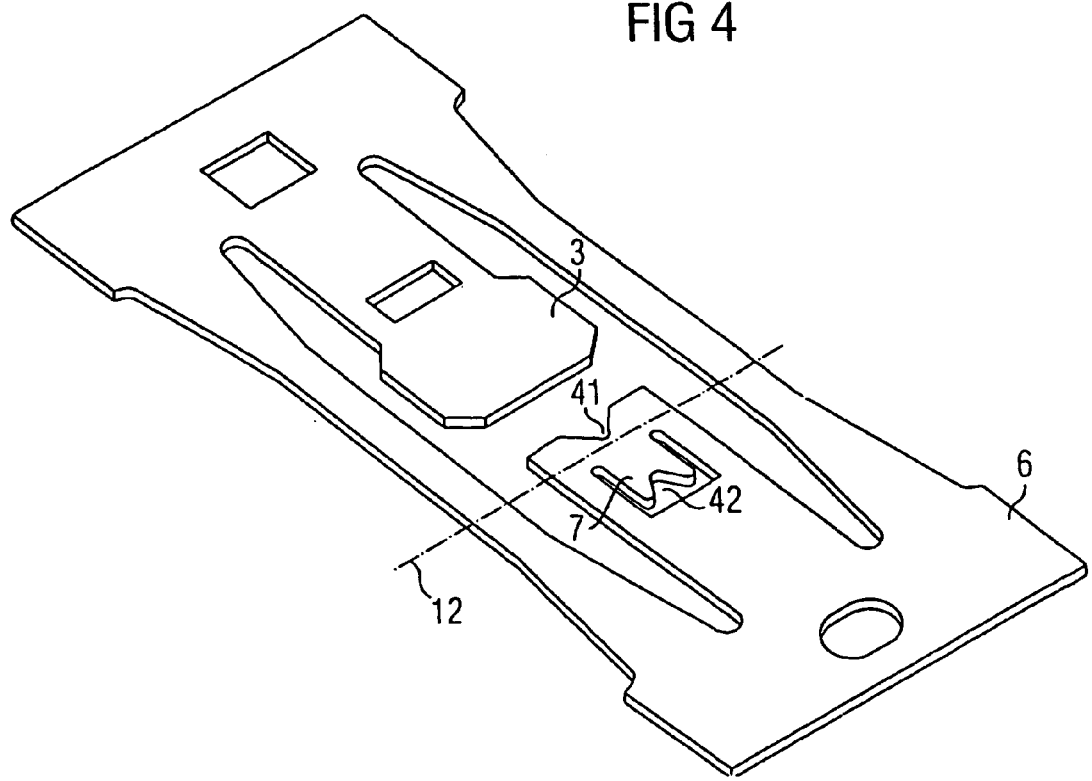

FIG 5
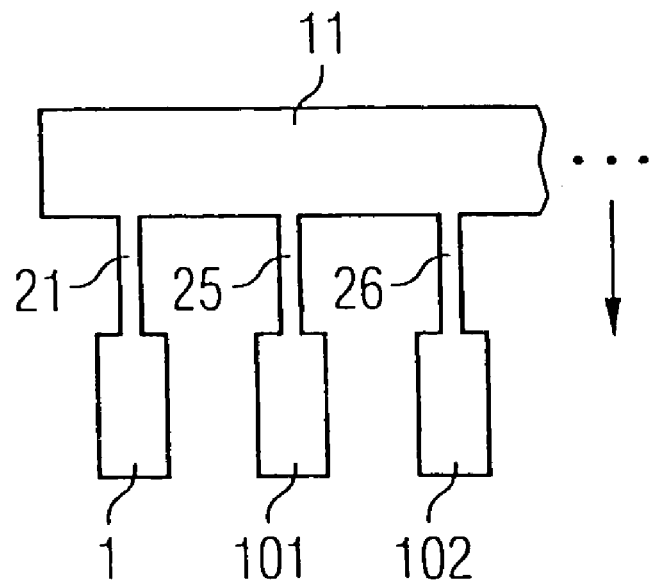
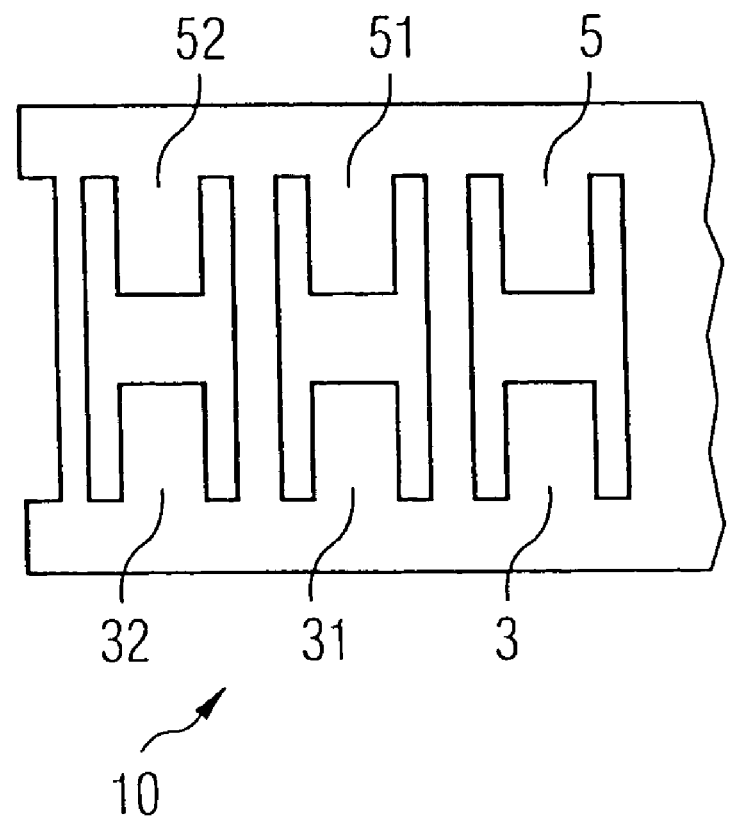

CHIP CAPACITOR AND METHOD FOR THE PRODUCTION THEREOF

TECHNICAL FIELD

The invention relates to a chip capacitor having at least two capacitor elements, each of which is provided with an anode contact. The invention also relates to a method for production of the capacitor.

BACKGROUND

Chip capacitors of the type stated initially are known, in which at least two capacitor elements are attached to a cathode contact by their flat sides.

The advantage of known chip capacitors is that, for assembly of the capacitor with multiple capacitor elements, each capacitor element is placed onto the cathode contact by means of a so-called pick-and-place device. Then each capacitor element is individually connected with a lead frame.

This procedure for production of the chip capacitor is time-consuming because each capacitor element must be assembled individually.

SUMMARY

It is a goal of the present invention to provide a chip capacitor that can be produced easily and quickly. Furthermore, it is a goal of the present invention to provide a method for production of the chip capacitor.

These goals are achieved, according to the invention, by means of a chip capacitor according to claim 1, as well as by a method according to claim 11. Additional embodiments of the invention are found in the dependent claims.

A chip capacitor is provided having at least two capacitor elements, each being provided with an anode contact. The anode contact protrudes from the interior of the contact body. Furthermore, the chip capacitor comprises a cathode contact. The capacitor elements are stacked on top of one another and mounted on the cathode body. In this arrangement, at least one capacitor element is provided with a broad side, which is mounted on the cathode contact.

As a result of at least one capacitor element being mounted on the cathode contact with its broad side and the stacking of capacitor elements on top of one another, it is possible to produce the chip capacitor by means of a method that allows for simultaneous production of a plurality of chip capacitors. This is because, in this case, it is no longer necessary to individually connect the capacitor elements with capacitor elements; instead, a plurality of capacitor elements can be connected with one cathode contact simultaneously. In addition, the arrangement of anode contact and cathode contact allows for production of chip capacitors that contain at least two capacitor elements, which can be connected in parallel within the chip capacitor. The advantage of such parallel connection of multiple capacitor elements within the chip capacitor is that the chip capacitor has a low electric serial resistance.

A method for production of a chip capacitor is provided, in which a system carrier is made available in a first step. The system carrier comprises cathode contacts arranged in series. An anode connection to the system carrier is arranged opposite each of the cathode contacts. In addition, a plurality of capacitor elements is provided, each of which is provided with an anode contact. Each of the anode contacts protrudes from the capacitor element. The capacitor elements are connected with a shared capacitor carrier, in comb-like fashion, by means of the anode contacts. A plurality—but at least two—of such capacitor carriers is made available.

In a further step, the system carrier and a first capacitor carrier are placed on top of one another.

Capacitor elements are attached to the corresponding cathode contact. In addition, anode contacts are attached to the corresponding anode connection of the system carrier.

In a further step, the system carrier and another capacitor carrier are placed on top of one another. Capacitor elements are attached to assemblies consisting of a capacitor element and a cathode contact. In addition, anode contacts are attached to the corresponding anode connections of the system carrier.

An advantage of the method is that several anode bodies are attached to cathode contacts simultaneously. A further advantage of the method is that a plurality of chip capacitors having multiple capacitor elements can be produced simultaneously.

The attachment of the capacitor element to the cathode contact can be advantageously accomplished by means of a conductive adhesive. The advantage of the conductive adhesive is that it is easily processed and that, in addition to the adhesion of two parts to one another, it provides for a good electrical contact.

Anode contacts can be arranged in recesses of an anode connection. This results in the advantage that the anode contacts can be attached locally, which facilitates the construction of the chip capacitor.

In addition, the recesses can advantageously be open to the side of the respective contact body opposite the cathode contact. This facilitates positioning the capacitor element from a position on the upper assembly side into the desired position, either on the cathode contact or on a capacitor element already present in the chip capacitor, while at the same time inserting the anode contact into its intended position at the anode connection.

In an advantageous embodiment of the invention, the recesses are cut in V-shaped form from a segment of sheet metal. The segment of sheet metal is bent perpendicularly out of the plane of the sheet metal. The sheet metal progresses in parallel to the cathode contact, while the segment having the V-shaped cutouts progresses at least approximately perpendicular to the cathode contact. Because the cathode contact and the sheet metal, which forms a section of the anode connection, progress at least approximately in parallel to one another, it is possible to form the cathode contact and the anode connection as parts of a system carrier, while at the same time significantly increasing the number of chip capacitors that can be produced.

The capacitor elements can be attached on different sides of the cathode contact. This makes it possible to achieve a symmetrical structure of the chip capacitor having substantial mechanical strength.

In another embodiment of the invention, the capacitor elements can be stacked on top of one another and attached on one and the same side of the cathode contact. This makes it possible to always attach the capacitor elements to the cathode contact from the same side. This simplifies assembly, because rotation of the cathode contact is no longer necessary.

To achieve secure insertion of the anode contact into the V-shaped recess, also when capacitor elements are stacked on the same side of the cathode contact, it is advantageous if the anode contacts arranged on the same side of the cathode contact are laterally offset relative to one another, so that each anode contact has unimpeded access in the V-shaped recess intended for it.

On the other hand, the anode contacts of two capacitor elements mounted on different sides of the cathode contact can be stacked vertically, which reduces the diversity of design of the capacitor element, simplifying and thus reducing the cost of production.

In an advantageous embodiment of the invention, the anode contacts can be attached in the recesses by means of laser welding. The attachment of the anode contacts in recesses by means of laser welding has the advantage that, as a result of the laser welding, separation of the capacitor element from the capacitor carrier can be achieved, which at the same time results in detachment.

Accordingly, an advantageous method is one in which each of the capacitor elements of the additional capacitor carrier is attached to the corresponding capacitor element of the first capacitor carrier. This results in a chip capacitor having stacked capacitor elements, which are attached on only one side of the cathode contact.

In the following, the invention will be explained in greater detail, using exemplary embodiments and the related figures.

DESCRIPTION OF THE DRAWINGS

FIG. 3 shows, as an example, another chip capacitor according to the invention, in a perspective lateral view.

FIG. 4 shows a segment of a system carrier such as that which can be used to produce the chip capacitor according to the invention or for use in the method according to the invention.

FIG. 5 shows, as an example, a method, according to the invention, for the production of a chip capacitor.

DETAILED DESCRIPTION

Figure 1:
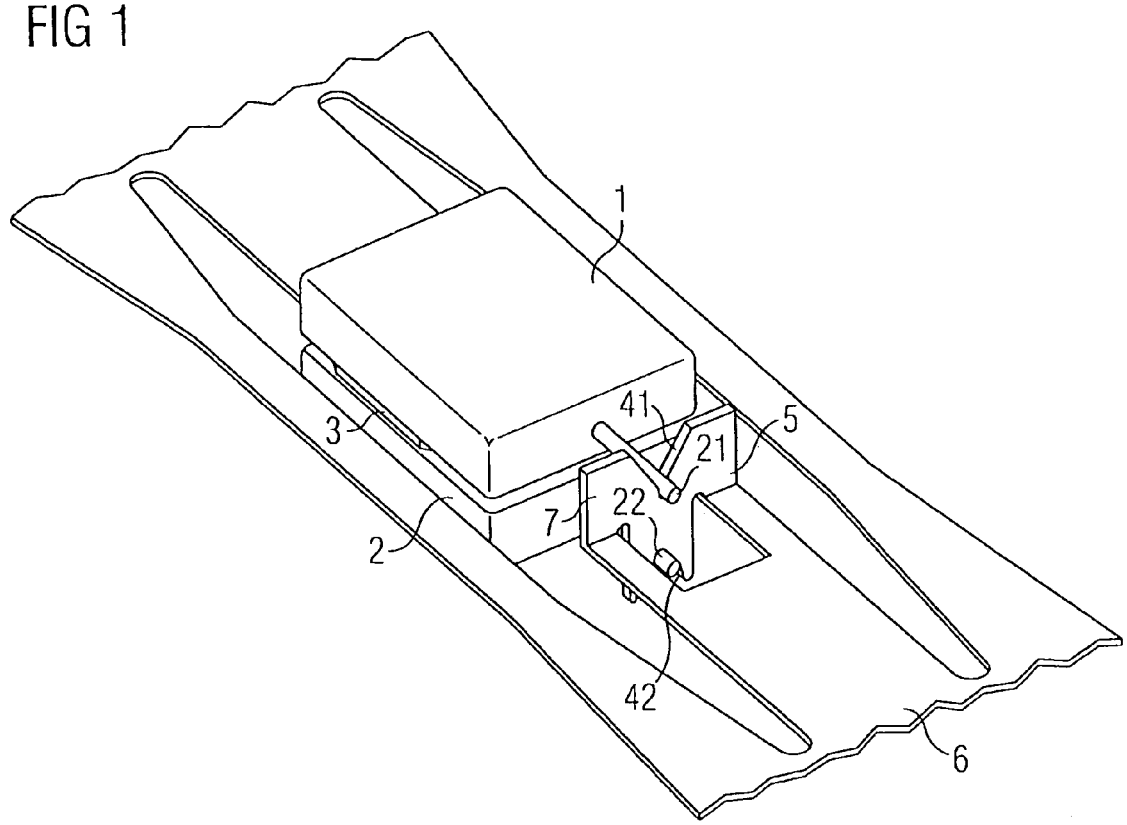
FIG. 1 shows, as an example, a chip capacitor during production, in a perspective lateral view.

FIG. 1 shows a chip capacitor having two capacitor elements 1, 2. The capacitor elements 1, 2 are shaped as cuboids. The broad sides of the capacitor elements 1, 2 are attached to the upper side or the lower side of a sheet metal-like cathode contact 3 by means of a conductive adhesive.

Anode contacts 21, 22 protrude outward from the interior of the capacitor elements 1, 2. The anode contacts 21, 22 are arranged in V-shaped recesses 41, 42, where they are attached by means of laser welding. The recesses 41, 42 are cut from a segment 7 of a piece of sheet metal 6. In this arrangement, the recess 41 is open to the upper side of the cathode contact 3, while the recess 42 is open to the lower side of the cathode contact 3. This enables the anode contacts 21, 22 of the capacitor elements 1, 2 to be easily placed into the recesses 41, 42 and thus mounted onto the cathode contact 3 from the upper side or from the lower side. The segment 7 of the piece of sheet metal 6 bearing the recesses 41, 42 is angled by approximately 90° relative to the assembly plane. This angle is achieved by bending a piece of sheet metal 6, such as that shown in FIG. 4 as part of a system carrier. The V-shaped recesses 41, 42 also have the advantage that they can be used to adjust the anode contacts 21, 22.

In FIG. 1, the capacitor elements 1, 2 are attached to different sides of the flat cathode contact 3.

Figure 2:
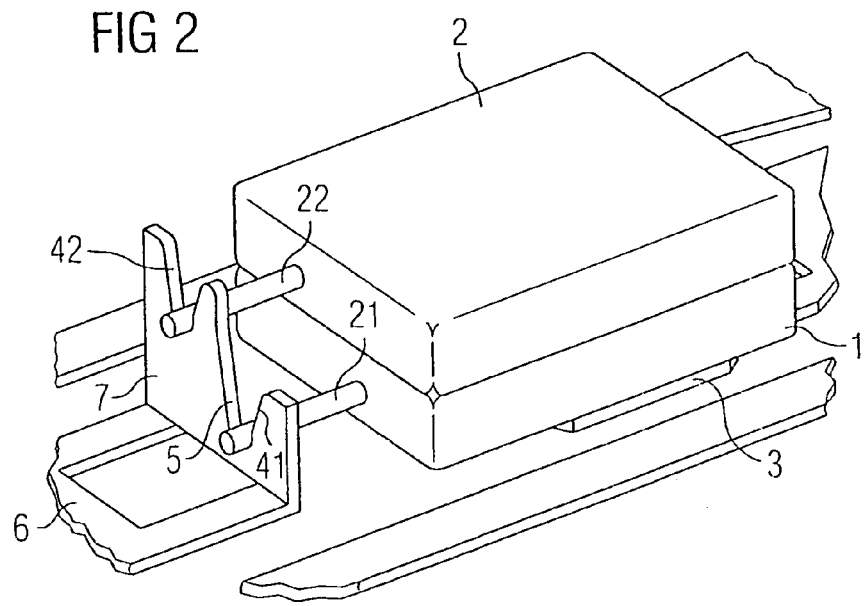
FIG. 2 shows; as an example, another chip capacitor according to the invention, in a perspective lateral view.

According to FIG. 2, the capacitor elements 1, 2 are attached to the same side of a cathode contact 3. In this arrangement, the capacitor elements 1, 2 form a stack of capacitor elements 1, 2 stacked, respectively, on top of their broad lateral surfaces and on top of the cathode contact 3.

The capacitor elements 1, 2 are attached to one another by means of electrically conductive adhesive, such as conductive silver. The stack of capacitor elements 1, 2 are in turn attached to the cathode contact 3 by means of conductive adhesive. The anode contacts 21, 22 protruding from the interior of the capacitor elements 1, 2 are laterally offset relative to one another, so that each individual anode contact can engage a V-shaped recess 41, 42, said recess being disposed at the suitable level on the segment 7 of the piece of sheet metal 6. As in FIG. 1, the segment 7 of the piece of sheet metal 6 forms the anode connection 5 of the chip capacitor to be produced.

The capacitor elements 1, 2 can, for example, be sintered bodies made of tantalum powder known in the art, with which an electrolyte capacitor with an externally located cathode electrode is produced by means of known methods. In this arrangement, a tantalum wire is used as anode contact, for example. Said wire is made by compressing tantalum powder, then sintered and subsequently provided with a dielectric by means of oxidation. The cathode layer consists of manganese dioxide, which is produced from manganese nitrate in a pyrolysis process. Additional layers of graphite and silver enamel serve as contact layers.

However, capacitor elements that contain niobium instead of tantalum and/or polymer instead of manganese dioxide can also be used.

FIG. 3 shows another capacitor during production, two capacitor elements 1, 8 as well as 2, 9, respectively, being attached to each side of a cathode contact 3. In this arrangement, a segment 7 of the piece of sheet metal 6 is provided with a total of four V-shaped recesses 41, 42, 48, 49, each of which is arranged at a level specially suited for a capacitor element 1, 2, 8, 9. The capacitor elements 1, 2, 8, 9 are provided with anode contacts 21, 22, 28, 29, which engage the corresponding recess 41, 42, 48, 49.

FIG. 4 shows a cathode contact 3 as well as a piece of sheet metal 6 with a segment 7, which forms the anode connection of a chip capacitor, as part of a system carrier. A system carrier of this nature is depicted schematically in FIG. 5. The cathode contact 3, as a flat piece of sheet metal, is attached to one side of the system carrier. A piece of sheet metal 6 having a segment 7 is attached to the opposite side of the cathode contact 3. The segment 7 of the sheet metal can be provided with two V-shaped recesses 41, 42, oriented in opposite directions, by means of cutting. To bring the segment 7 into a position in which it is suitable for the acceptance of anode contacts 21, 22 of capacitor elements of a chip capacitor, all that is necessary is to bend the segment 7 of the piece of sheet metal 6 by 90° along the bending line 12. As a result, the V-shaped recess 41 tilts upward out of the sheet metal plane and the V-shaped recess 42 tilts downward, also out of the plane of the piece of sheet metal 6, as a result of which the anode connection 5 depicted in FIG. 1 can be realized.

FIG. 5 shows the method for production of a chip capacitor. A system carrier 10 having cathode contacts 3, 31, 32 is made available. Anode connections 5, 51, 52 are provided on the opposite side of the cathode contacts 3, 31, 32. The illustration in FIG. 5 is purely schematic; refer to FIG. 4 for the exact design of the system carrier 10 and/or the cathode contacts 3, 31, 32 and the anode contacts 5, 51, 52.

In addition, at least two capacitor carriers 11 are made available, to which capacitor carriers a plurality of anode contacts 21, 25, 26 are attached in comb-like fashion, said anode contacts in turn bearing capacitor elements 1, 101, 102. The system carrier 10 and a capacitor carrier 11 are stacked on top of one another, as indicated by the arrow, and, subsequently, the capacitor elements 1, 101, 102 are connected with cathode contacts 3, 31, 32 by means of attachment to one another. This attachment can be achieved by means of conductive adhesive, for example. In addition, the anode contacts 21, 25, 26 are connected with the anode connections 5, 51, 52, which are already suitably bent. This connection is achieved by means of laser welding, for example, wherein the anode contacts 21, 25, 26 can be separated from the capacitor carrier 11 at the same time, whereby the first step toward detachment is accomplished simultaneously.

Figure 6:
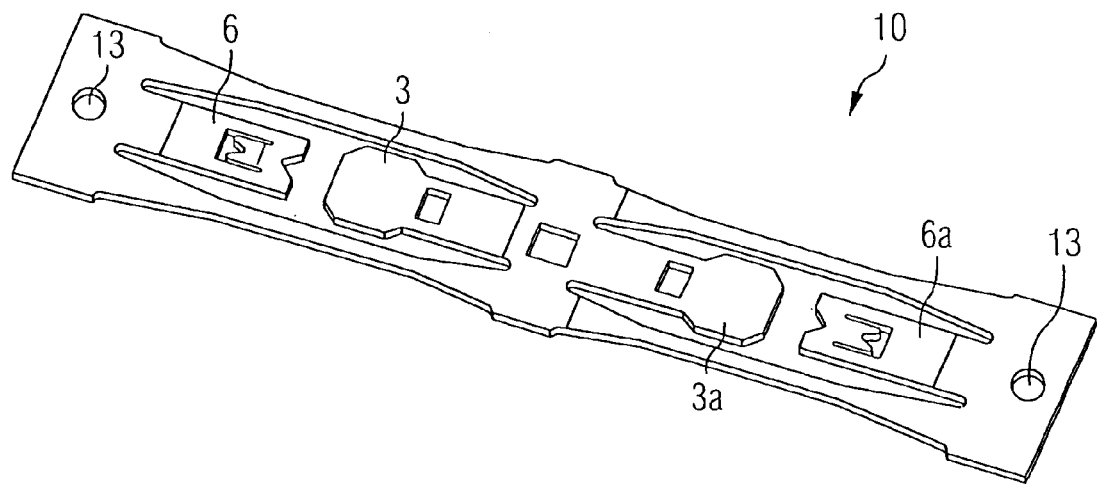
FIG. 6 shows, as an example, an unassembled system carrier suitable for the implementation of the production method, in a top view.

FIG. 6 shows a system carrier 10, in which pairs of opposing pieces of sheet metal 6 and cathode contacts 3, as well as pairs of opposing pieces of sheet metal 6a and cathode contacts 3a are arranged adjacent to one another. This results in the formation of a two-row system carrier 10, in which the yield of chip capacitor can be increased once more, because two capacitor carriers coming from opposite sides of the system carrier 10 can be mounted on said system carrier at the same time. The system carrier 10 is provided with transport holes 13 along its edge.

Figure 7:
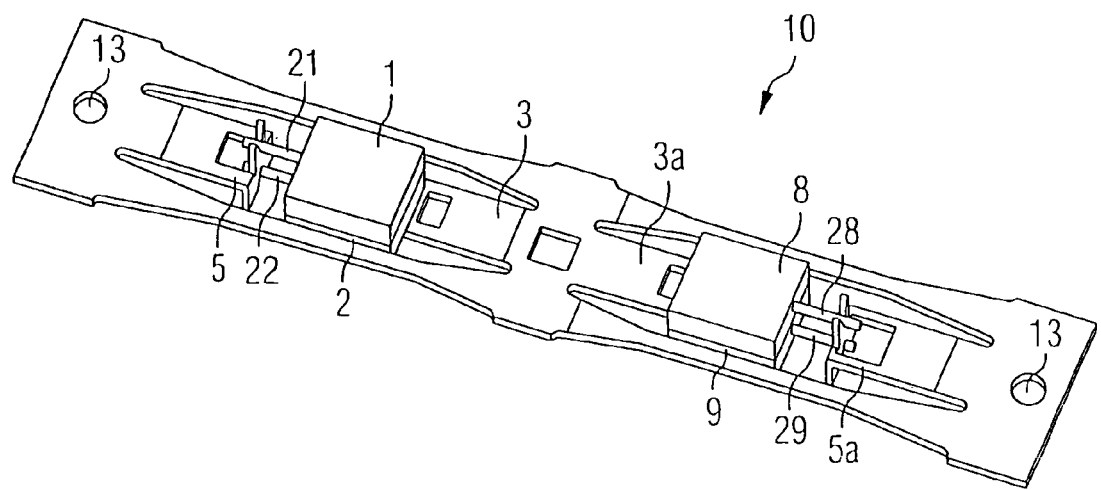
FIG. 7 shows the system carrier from FIG. 6, in its assembled state.

FIG. 7 shows the system carrier from FIG. 6, in its assembled state. On the left half of the system carrier 10, the capacitor elements 1 and 2, respectively, are mounted above and below the cathode contact 3 and connected with the anode connection 5.

On the right half, the capacitor elements 8 and 9, respectively, are mounted above and below the cathode contact 3a and connected with the anode connection 5a. The anode contacts 21 and 22 point in the direction opposite the anode contacts 28, 29, which shows that two capacitor carriers can be mounted simultaneously onto the system carrier 10 from the right and the left. This is achieved in that the two cathode contacts 3, 3a are arranged in the interior region and the anode contacts 5, 5a in the exterior region of the system carrier strip 10, as a result of which a mirror image-like arrangement is achieved with respect to a longitudinal direction of the system carrier 10.

It should be noted that the process steps relating to the attachment of the capacitor elements to the cathode contacts and/or the anode contacts can be performed in any order.

The invention claimed is:

1. An electrolytic chip capacitor comprising:
   a first capacitor element;
   a first anode contact for said first capacitor element extending from said first capacitor element;
   a second capacitor element;
   a second anode contact for said second capacitor element, extending from said second capacitor element parallel to said first anode contact; and
   a cathode contact;
   an anode connection having a plurality of stepped recesses to receive said anode contacts
   wherein said first and second capacitor elements are stacked;
   wherein at least one capacitor element is attached to said cathode contact; and
   wherein said first and second anode contacts are laterally offset relative to one another and said recesses in said anode connection are laterally offset correspondingly.

2. A chip capacitor according to claim 1 wherein at least one stacked capacitor element is attached to said cathode contact using a conductive adhesive.

3. A chip capacitor according to claim 2 wherein said first and second capacitor elements are attached to different sides of said cathode contact.

4. A chip capacitor according to claim 2 wherein said first and second capacitor elements are attached to each other using a conductive adhesive.

5. A chip capacitor according to claim 1 wherein said anode contacts extend beyond the anode connection.

6. A chip capacitor according to claim 1 wherein said anode connection comprises a metal sheet and wherein said recesses comprise V-shaped segments in said sheet metal, said sheet metal being bent such that a portion thereof is substantially parallel to said cathode contact.

7. A chip capacitor according to clam 6 wherein all of said capacitor elements are on one side of said anode connection.

8. A chip capacitor according to claim 6 wherein said capacitor elements are on different sides of said anode connection.

9. A chip capacitor according to claim 6 wherein said cathode contact is serially connected with each capacitor element using a conductive adhesive.

10. An electrolytic chip capacitor comprising a plurality of stacked capacitor elements, each capacitor element having an anode contact protruding therefrom, at least one cathode contact serially connected to said plurality of capacitor elements, and an anode connection in contact with each of said anode contacts, wherein each of said anode contacts is laterally offset from each other anode contact on the same side of said anode connection, said anode connection having recesses disposed laterally corresponding to said anode contact.

11. An electrolytic chip capacitor according to claim 10 wherein said recesses in said anode connection are stepped.

* * * * *